(12) United States Patent
Mao

(10) Patent No.: US 10,614,067 B2
(45) Date of Patent: Apr. 7, 2020

(54) ELECTRONIC DEVICE THAT OPERATIVELY OBTAINS CONTACT INFORMATION FROM MULTIPLE APPLICATIONS

(71) Applicant: Lenovo (Beijing) Limited, Beijing (CN)

(72) Inventor: Daishan Mao, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 733 days.

(21) Appl. No.: 15/084,277

(22) Filed: Mar. 29, 2016

(65) Prior Publication Data

US 2017/0161328 A1    Jun. 8, 2017

(30) Foreign Application Priority Data

Dec. 7, 2015   (CN) .......................... 2015 1 0889319

(51) Int. Cl.
*G06F 16/2455*   (2019.01)
*G06Q 10/10*    (2012.01)
*H04M 1/2745*   (2020.01)

(52) U.S. Cl.
CPC ......... *G06F 16/2455* (2019.01); *G06Q 10/10* (2013.01); *H04M 1/2745* (2013.01); *H04M 1/274558* (2013.01)

(58) Field of Classification Search
CPC .............. G06Q 10/10; G06F 17/30477; G06F 16/2455; H04M 1/2745; H04M 1/274583; H04M 1/274558; H04M 1/72522

USPC .......................................................... 707/769
See application file for complete search history.

(56) References Cited

U.S. PATENT DOCUMENTS

| | | | | |
|---|---|---|---|---|
| 7,620,387 B2 * | 11/2009 | Rybak | ..................... | H04L 51/38 455/412.1 |
| 8,914,001 B1 * | 12/2014 | Johnson | ................ | H04W 12/06 455/412.1 |
| 9,519,395 B1 * | 12/2016 | Kuscher | ................ | G06F 3/0483 |
| 2004/0221151 A1 * | 11/2004 | Kajita | ................... | G06F 13/385 713/2 |
| 2005/0277409 A1 * | 12/2005 | Etelapera | ............ | H04M 1/2745 455/418 |

(Continued)

FOREIGN PATENT DOCUMENTS

| CN | 102957592 A | 3/2013 |
|---|---|---|
| CN | 103973550 A | 8/2014 |

(Continued)

*Primary Examiner* — Phong H Nguyen
(74) *Attorney, Agent, or Firm* — Ference & Associates LLC

(57) ABSTRACT

One embodiment provides a data processing method including: acquiring a first identity information inputted by a user; inquiring, based on the first identity information, a second identity information corresponding to the first identity information in a second information list different from a first information list; acquiring, based on the second identity information, a second communication code corresponding to the second identity information, wherein the second communication code is used for the first device to initiate a voice communication connection or a data communication connection to a second device corresponding to the second communication code. Other aspects are described and claimed.

18 Claims, 14 Drawing Sheets

(56) References Cited

U.S. PATENT DOCUMENTS

2014/0171042 A1\* 6/2014 Mao ........................ H04L 67/10
455/414.1

FOREIGN PATENT DOCUMENTS

| CN | 104023141 A | 9/2014 |
|----|-------------|--------|
| CN | 104954977 A | 9/2015 |

\* cited by examiner

US 10,614,067 B2

ELECTRONIC DEVICE THAT OPERATIVELY OBTAINS CONTACT INFORMATION FROM MULTIPLE APPLICATIONS

CLAIM FOR PRIORITY

This application claims priority to Chinese Application No. 201510889319.9, filed on Dec. 7, 2015, which is fully incorporated by reference herein.

FIELD

The subject matter described herein relates to the technical field of data communication, more specifically, it relates to a data processing method and apparatus.

BACKGROUND

With the development of communication technologies, mobile phones have become popular among many users. When the user performs communication, such as a voice communication, with other users by the mobile phone the user typically needs to apply for a communication number, such as a Subscriber Identity Module (SIM) card, from a communication operator in advance. With the SIM card, the user can establish a communication connection, i.e., voice communication, with the SIM card of the peer user.

Therefore, the way communication connection presently functions, the user can only establish the communication connection after knowing the SIM card number of the communication peer or finding the SIM card number in a contact list preset on the mobile phone by the name of the communication peer. The communication cannot be realized when the SIM card number of the corresponding communication peer is not stored in the mobile phone contact list.

BRIEF SUMMARY

In summary, one aspect provides an electronic device, comprising: a processor; a memory module coupled to the processor, wherein the memory module stores a plurality of applications including a first application and a second application; a display module coupled to the processor, wherein the display module displays the plurality of applications; an input module coupled to the processor, wherein the input module inputs information into the processor; wherein the processor is operative to determine if a first contact information in relation to a first identity information input via the input module is available from the first application; and wherein the processor is operative to determine a second identity information corresponding to the first identity information from the second application and whether a second contact information in relation to the second identity information is available if the first contact information is not available from the first application.

Another aspect provides a data processing method, comprising: acquiring a first identity information inputted by a user; inquiring, based on the first identity information, a second identity information corresponding to the first identity information in a second information list different from a first information list; acquiring, based on the second identity information, a second communication code corresponding to the second identity information, wherein the second communication code is used for the first device to initiate a voice communication connection or a data communication connection to a second device corresponding to the second communication code.

A further aspect provides a data processing apparatus, comprising: a first identity acquiring unit, wherein the first identity acquiring unit acquires a first identity information inputted by a user; a second identity acquiring unit, wherein the second identity acquiring unit inquires, based on the first identity information, a second identity information corresponding to the first identity information in a second information list different from a first information list; a second code acquiring unit, wherein the second code acquiring unit acquires, based on the second identity information, a second communication code corresponding to the second identity information, wherein the second communication code is used for the first device to initiate a voice communication connection or a data communication connection to a second device corresponding to the second communication code.

The foregoing is a summary and thus may contain simplifications, generalizations, and omissions of details; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Figure 1:
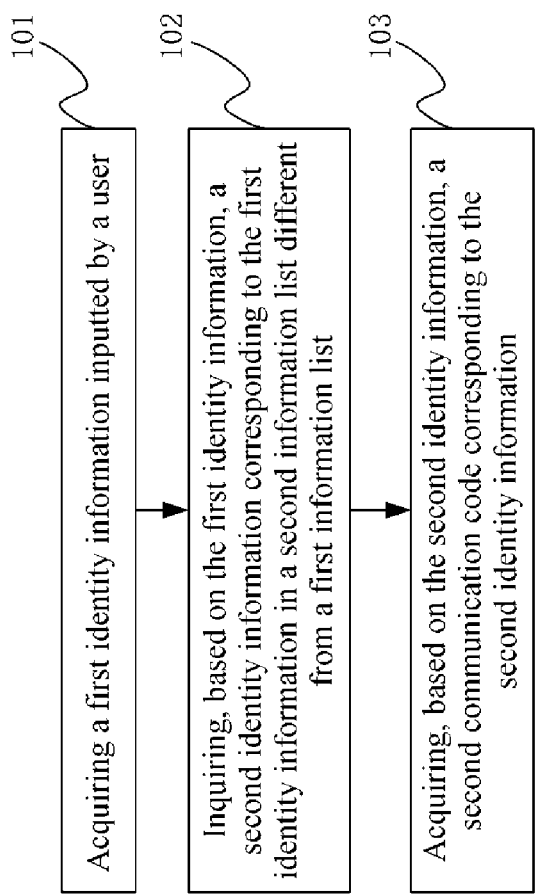
FIG. 1 is a flow diagram of a data processing method according to an embodiment.

Referring to FIG. 1, which is an implementation flow diagram of a data processing method provided in embodiment 1, the method can be applied to a first device. The first device can be an electronic device, such as a mobile phone or a pad, which can establish communication connection with other devices. The first device is provided with a plurality of different applications, such as a contact list application, a chatting application, a shopping application or a game application.

In an embodiment, the method includes, at 101, acquiring first identity information inputted by a user. The first identity information can be the identity information of the communication peer, to whom the user needs to establish a communication connection, inputted by the user, and can be information, such as a name or nickname of the communication peer, e.g., "Mr. Luo".

At 102, the method includes inquiring, based on the first identity information, a second identity information corresponding to the first identity information in a second information list different from a first information list. The first information list contains multiple pieces of first identity information while the second information list contains multiple pieces of second identity information. The first information list corresponds to a first application, the second information list corresponds to a second application, and the first application is different from the second application.

For example, the first application is the current application, e.g., the contact list application and the first information list is then a contact information list. The second application is the Wechat application and the second information list is then a Wechat friend information list. In the present embodiment, the second identity information "LUO Yonghao" corresponding to "Mr. Luo" can be looked up in the Wechat friend information list of the Wechat application.

At 103, the method includes acquiring a second communication code corresponding to the second identity information based on the second identity information. The second communication code is used for the first device to initiate a voice or data communication connection to a second device corresponding to the second communication code.

In other words, in the present embodiment, the second identity information of the communication peer can be further determined, i.e., identity information that can correspond to the communication code of the communication peer, such as her/his name. Thus, in the present embodiment, the second communication code associated with the second identity information can be acquired based on the second identity information. Furthermore, the first device can initiate, by using the second communication code, a communication connection, at least comprising a voice communication connection or data communication connection, i.e., voice communication or video communication, to the second device corresponding to the second communication code.

As shown in the above-mentioned solution, according to the data processing method provided in an embodiment, by acquiring the first identity information, such as the name or nickname of the communication peer, inputted by the user, the second identity information corresponding to the first identity information can be found in the second information list different from the information list of the current application. Then, after the communication code corresponding to the second identity information is acquired, by using that communication code, a communication link is initiated to the corresponding device. Thereby, according to an embodiment, even if the communication code of the peer does not exist in the current application, i.e., the contact list, the communication code can be acquired by the identity on other applications, thus realizing the communication.

Figure 2:
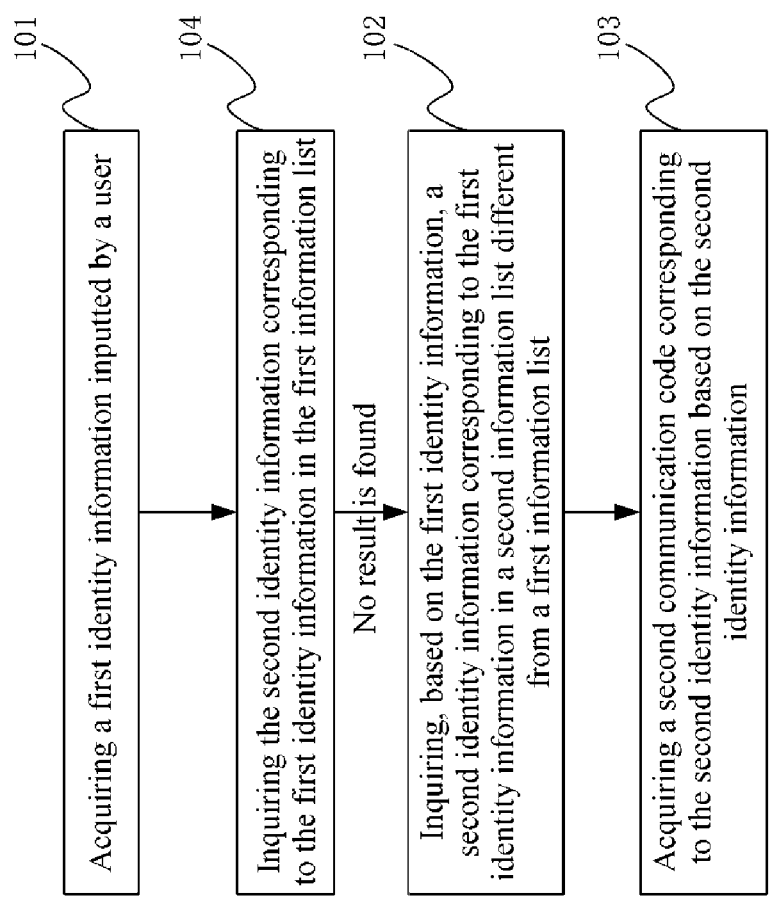
FIG. 2 is a flow diagram of a data processing method according to an embodiment.

Referring to FIG. 2, which is an implementation flow diagram of a data processing method according to embodiment 2, before 102, the method includes, at 104, inquiring the second identity information corresponding to the first identity information. When no second identity information corresponding to the first identity information is found in the first information list, executing 102 to inquire the second identity information corresponding to the first identity information in the second information list.

In other words, the present embodiment first inquires the second identity information corresponding to the first identity information in the first information list of the first application, i.e., the contact list. When no result is found, the present embodiment can inquire the second identity information corresponding to the first identity information in the second information list of a second application different from the first application.

For example, the first application is a contact list application and the second application is the Wechat application. The contact list application has a contact information list and the Wechat application has a Wechat friend information list. In the present embodiment, after the first identity information "Mr. Luo" inputted by the user is acquired, when no communication code corresponding to "Mr. Luo" exists in the contact list application, the method will firstly inquire whether a second identity information corresponding to the identity "Mr. Luo" exists in the contact information list of the contact list application, i.e., the method will check whether there are any other registered names for "Mr. Luo" to find the second identity information.

Continuing with the example, in cases where no second identity information corresponding to "Mr. Luo" exists in the contact information list, the method can inquire in other applications on the first device, i.e., in the Wechat friend list of the Wechat application, namely, inquire whether there exists any registrations or tags corresponding to "Mr. Luo" in the Wechat friend list. The identity information "LUO Yonghao" corresponding to "Mr. Luo" is found, and a communication code of the second identity information "LUO Yonghao" is then acquired. Thereby, the first device subsequently initiates the voice or data communication connection to the second device corresponding to the communication code by using the communication code.

Figure 3:
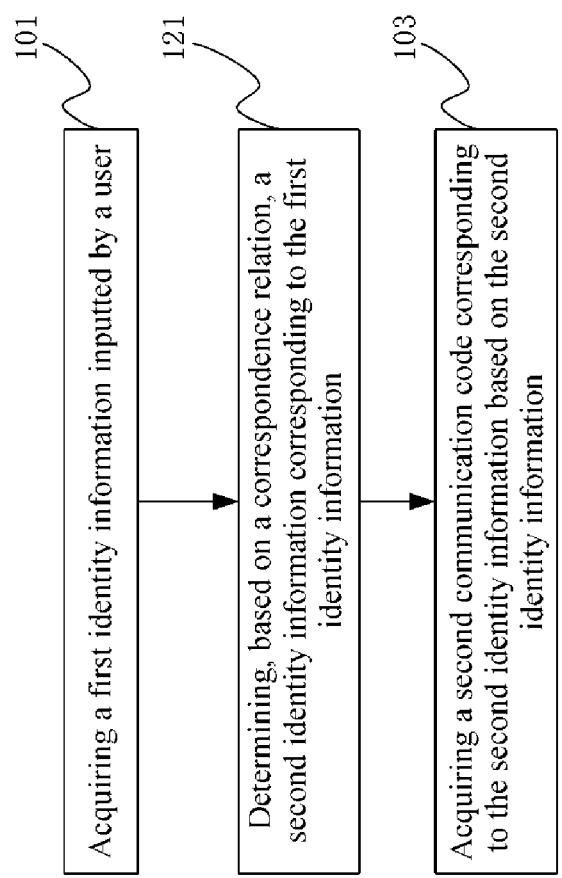
FIG. 3 is a flow diagram of a data processing method according to an embodiment.

Referring to FIG. 3, which is an implementation flow diagram of step 102 in a data processing method according to embodiment 3, the method includes, at 121, determining, based on a correspondence relation, a second identity information corresponding to the first identity information. The correspondence relation can be acquired from a first application, a second application, or a third application different from both the first application and the second application.

The correspondence relation can be a correspondence relation between names and registrations or labels among various applications. For example, the correspondence relation can be between contact names in the contact list and Wechat names in the Wechat application, or the correspondence relation can be between the contact names in the contact list and friend names in a QQ application, or the correspondence relation can be between the network nicknames and consignees in a Taobao application.

Furthermore, in the present embodiment, by using the correspondence relation in the first information list, a second information list of the Wechat or QQ application different from the contact list application, or a third information list of the Taobao application different from the contact list application and Wechat application, according to the correspondence relation, the second identity information, i.e., the Wechat registered or label name "LUO Yonghao" corresponding to the first identity information "Mr. Luo", is found. Furthermore, the communication code of the second identity information "LUO Yonghao" is acquired. Thereby, the first device uses the communication code to initiate a voice or data communication connection to a second device corresponding to the communication code.

In specific implementation, if the correspondence relation is acquired from the first application, correspondingly, in the present embodiment, in 121, the second identity information can be acquired by the following specific manner: determining the second identity information corresponding to the first identity information in the first information list.

For instance, in the contact list application, there exists correspondence relation between the contact name "Mr. Luo" in the first information list and its registered name "LUO Yonghao". In the present embodiment, by using the correspondence relation, the second identity information "LUO Yonghao" corresponding to the first identity information "Mr. Luo" is determined in the first information list. Furthermore, the communication code of the second identity information "LUO Yonghao" is acquired. Thereby, the first device uses the communication code to initiate a voice or data communication connection to a second device corresponding to the communication code.

In addition, if the correspondence relation is acquired from the second application, correspondingly, in an embodiment, in 121, the second identity information can be acquired by the following specific manner: determining the second identity information corresponding to the first identity information in the second information list.

For instance, in the Wechat application different from the contact list application, there exists correspondence relation between the first identity information and a Wechat friend name or its label name in the second information list. In the present embodiment, by using the correspondence relation, the second identity information "LUO Yonghao" corresponding to the first identity information "Mr. Luo" is determined in the second information list. Furthermore, the communication code of the second identity information "LUO Yonghao" is acquired. Thereby, the first device uses the communication code to initiate a voice or data communication connection to a second device corresponding to the communication code.

In addition, if the correspondence relation is acquired from a third application different from both the first application and the second application, correspondingly, in the present embodiment, in 121, the second identity information can be acquired by the following specific manner: acquiring a third information list in the third application, and determining the second identity information corresponding to the first identity information in the third information list.

For instance, in the Taobao application different from the contact list application and the Wechat application, there exists correspondence relation between Taobao nicknames and the consignee address. In the present embodiment, according to the correspondence relation, the third information list in the third application namely the Taobao application is acquired. The second identity information "LUO Yonghao" (consignee) corresponding to the first identity information "Mr. Luo" (Taobao nickname) is found in the third information list. Furthermore, the communication code of the second identity information "LUO Yonghao" is acquired. Thereby, the first device uses the communication code to initiate a voice or data communication connection to a second device corresponding to the communication code.

Figure 4:
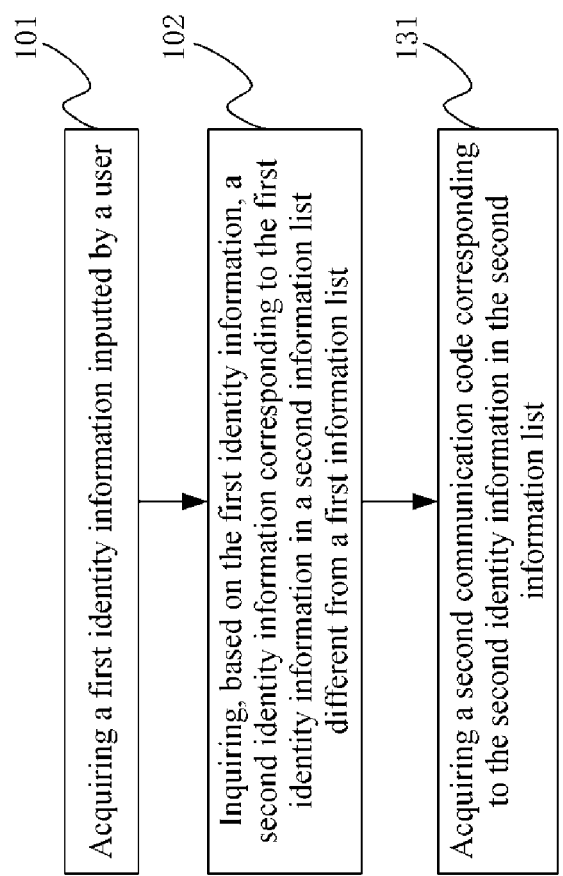
FIG. 4 is a flow diagram of a data processing method according to an embodiment.

Referring to FIG. 4, which is an implementation flow diagram of a data processing method provided in embodiment 4, the step 103 can be realized by the following step 131, which includes acquiring a second communication code corresponding to the second identity information in the second information list.

For instance, in the Wechat application different from the contact list application, there exists correspondence relation between the first identity information and a Wechat friend name or its label name in the second information list, in the present embodiment, by using the correspondence relation, the second identity information "LUO Yonghao" corresponding to the first identity information "Mr. Luo" is determined in the second information list. Furthermore, in the Wechat friend list of the Wechat application, the communication code of "LUO Yonghao" is extracted from the friend information or its Wechat number of the friend named "LUO Yonghao". Thereby, the first device uses the communication code to initiate a voice or data communication connection to a second device corresponding to the communication code.

Figure 5:
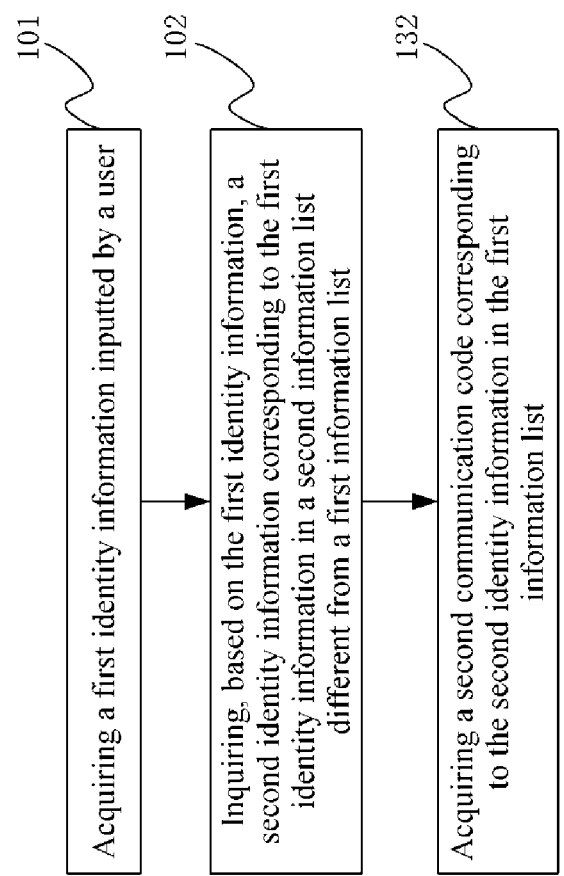
FIG. 5 is a flow diagram of a data processing method according to an embodiment.

Referring to FIG. 5, which is an implementation flow diagram of a data processing method provided in embodiment 5, the step 103 can be realized by the following step 132, which includes acquiring a second communication code corresponding to the second identity information in the first information list.

For instance, after the second identity information "LUO Yonghao" corresponding to the first identity information "Mr. Luo" is found in the second application, i.e., the Wechat application different from the first application, i.e., the contact list application, the communication code of "LUO Yonghao" is found in the first information list of the first application, namely the contact information list of the contact list. Furthermore, the first device uses the communication code to initiate a voice or data communication connection to a second device corresponding to the communication code.

In addition, the step 103 can further be realized in the following manner: acquiring a second communication code corresponding to the second identity information in the third information list of the third application.

For instance, after the second identity information "LUO Yonghao" corresponding to the first identity information "Mr. Luo" is found in the second application, i.e., the Wechat application different from the first application, i.e., the contact list application, when both the contact information list of the contact list and the Wechat friend list of the Wechat application do not contain the communication code of the second identity information "LUO Yonghao", in the third application, i.e., the Taobao application different from the first application and the second application, the communication code of the consignee name "LUO Yonghao" can be found. Furthermore, the first device uses the communication code to initiate a voice or data communication connection to a second device corresponding to the communication code.

Figure 6:
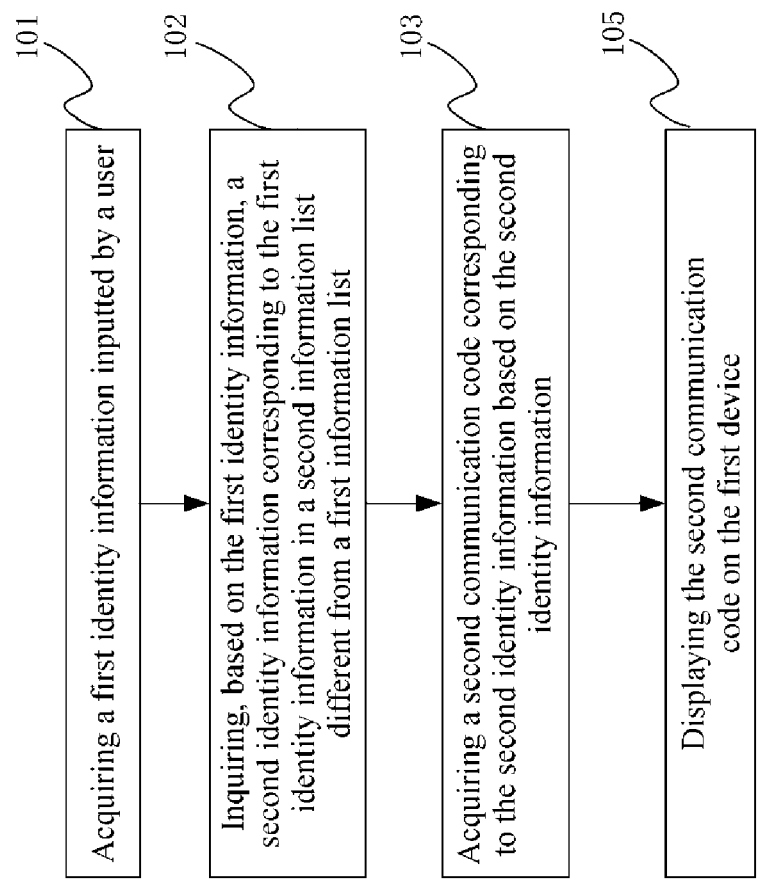
FIG. 6 is a flow diagram of a data processing method according to an embodiment.

Referring to FIG. 6, which is an implementation flow diagram of a data processing method provided by an embodiment 6, after step 103, the method includes, at 105, displaying the second communication code on the first device to prompt the user to use the first device to initiate a voice or data communication connection to the second device corresponding to the second communication code by using the second communication code.

Figure 7:
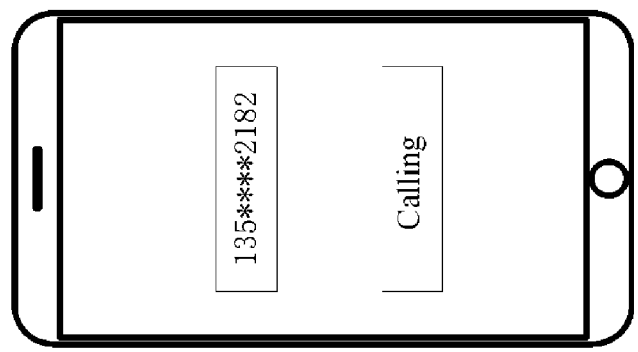
FIG. 7 is an application example diagram.

As shown in FIG. 7, the second communication code is displayed on the first device, and the user can initiate a voice or data communication connection to the second device corresponding to the second communication code by operating a corresponding control.

Figure 8:
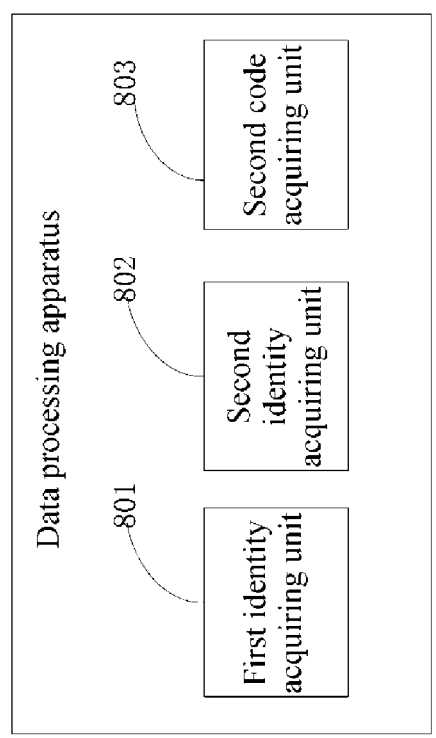
FIG. 8 is a structural schematic diagram of a data processing apparatus according to an embodiment.

Referring to FIG. 8, which is a structural schematic diagram of a data processing apparatus according to embodiment 7, the apparatus can be applied to a first device. The first device can be an electronic device, such as a mobile phone or a pad, which can establish communication connection with other devices. The first device can be provided with a plurality of different applications, such as a contact list application, a chatting application, a shopping application or a game application.

In the present embodiment, the apparatus can include: a first identity acquiring unit 801, used for acquiring a first identity information inputted by a user. The first identity information can be the identity information of the communication peer, to whom the user needs to establish a communication connection, inputted by the user, and can be information, such as a name or nickname, i.e., "Mr. Luo" of the communication peer.

The apparatus can include a second identity acquiring unit 802, used for inquiring, based on the first identity information, a second identity information corresponding to the first identity information in a second information list different from a first information list. The first information list contains multiple pieces of first identity information while the second information list contains multiple pieces of second identity information. The first information list corresponds to a first application, the second information list corresponds to a second application, and the first application is different from the second application.

For instance, the first application is the current application, i.e., the contact list application and the first information list is then a contact information list. The second application is the Wechat application and the second information list is then a Wechat friend information list. In the present embodiment, the second identity information "LUO Yonghao" corresponding to "Mr. Luo" can be found in the Wechat friend information list of the Wechat application.

The apparatus can include a second code acquiring unit 803, used for acquiring, based on the second identity information, a second communication code corresponding to the second identity information. The second communication code is used for the first device to initiate a voice or data communication connection to a second device corresponding to the second communication code.

In other words, in the present embodiment, the second identity information of the communication peer can be determined, i.e., the identity information, such as the name that can correspond to the communication code of the communication peer. Thereby, in the present embodiment, the second communication code associated with the second identity information can be acquired based on the second identity information. Furthermore, the first device can initiate communication connection, at least comprising a voice communication connection or data communication connection, i.e., voice communication or video communication, to the second device corresponding to the second communication code by using the second communication code.

Known from the above solution, according to the data processing apparatus provided by the embodiment 7, by acquiring the first identity information, such as the name or nickname of a communication peer, inputted by the user, the second identity information corresponding to the first identity information can be found in the second information list different from the information list of the current application. Then, after the communication code corresponding to the second identity information is acquired, by using the communication code, a communication link is initiated to the corresponding device. Thereby, according to the present disclosure, even if the communication code of the peer does not exist in the current application, i.e., the contact list, the communication code can be acquired by the identity on other applications, thus realizing the communication.

Figure 9:
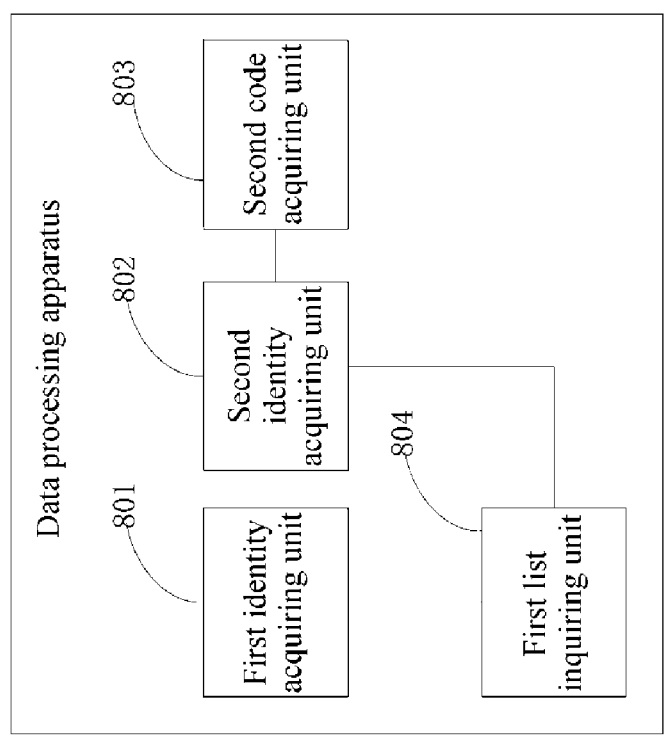
FIG. 9 is a structural schematic diagram of a data processing apparatus according to an embodiment.

Referring to FIG. 9, which is a structural schematic diagram of a data processing apparatus according to embodiment 8, the embodiment further includes a first list inquiring unit 804, used for inquiring the second identity information corresponding to the first identity information in the first information list. When the first list inquiring unit 804 found no second identity information corresponding to the first identity information in the first information list, the second identity acquiring unit 802 is triggered to inquire the second identity information corresponding to the first identity information in the second information list.

In other words, the present embodiment will firstly inquire the second identity information corresponding to the first identity information in the first information list of the current first application, i.e., the contact list, and when no result is found, the present embodiment can inquire the second identity information corresponding to the first identity information in the second information list of a second application different from the first application.

For instance, the first application is a contact list application and the second application is the Wechat application. The contact list application has a contact information list and the Wechat application has a Wechat friend list. In the present embodiment, after the first identity information "Mr. Luo" inputted by the user is acquired, when no communication code corresponding to "Mr. Luo" exists in the contact list application, the present embodiment will firstly inquire whether there exists a second identity information corresponding to the identity "Mr. Luo" in the contact information list in the contact list application. For example, the present embodiment may check whether there is any other remark names for "Mr. Luo" to find the second identity information. When no second identity information corresponding to "Mr. Luo" exists in the contact information list, the present embodiment can inquire in other application on the first device, i.e., the Wechat friend list of the Wechat application. The present embodiment namely inquires whether there exists a remark or label corresponding to "Mr. Luo" in the Wechat friend list. Furthermore, the identity information "LUO Yonghao" corresponding to "Mr. Luo" is found, and further, a communication code of the second identity information "LUO Yonghao" is acquired. Thereby, the first device initiates the voice or data communication connection to the second device corresponding to the communication code by using the communication code.

Figure 10:
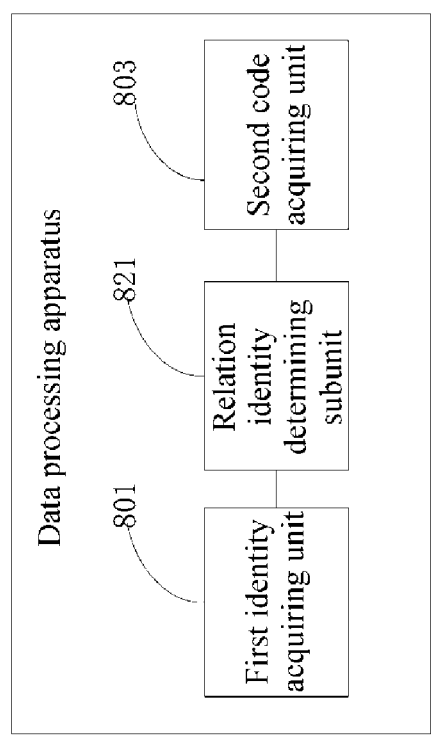
FIG. 10 is part of a structural schematic diagram of a data processing apparatus according to an embodiment.

Referring to FIG. 10, which is a structural schematic diagram of the second identity acquiring unit 802 in a data processing apparatus according to embodiment 9, the second identity acquiring unit 802 can comprise the following structure: a relation identity determining subunit 821, used for determining, based on a correspondence relation, second identity information corresponding to the first identity information. The correspondence relation can be acquired from a first application, a second application, or a third application different from the first application and the second application.

The correspondence relation can be a correspondence relation between names and registrations or labels among various applications, i.e., the correspondence relation between contact names in the contact list and Wechat names in the Wechat application, the correspondence relation between the contact names in the contact list and friend names in the QQ application, or the correspondence relation between the network nicknames and consignees in the Taobao application. Furthermore, in the present embodiment, by using the correspondence relation, in the first information list, a second information list of the Wechat or QQ application different from the contact list application or a third information list of the Taobao application different from the contact list application and Wechat application, according to the correspondence relation, the second identity information, i.e., the Wechat registered or label name "LUO Yonghao" corresponding to the first identity information "Mr. Luo" is found. Furthermore, the communication code of the second identity information "LUO Yonghao" is acquired. Thereby, the first device uses the communication code to initiate a voice or data communication connection to a second device corresponding to the communication code.

Figure 11:
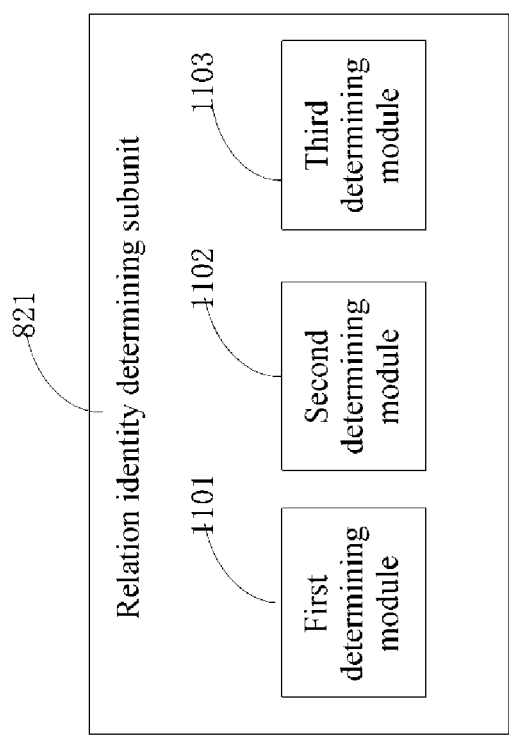
FIG. 11 is another part of the structural schematic diagram of the embodiment.

In specific implementation, as illustrated by the structure of the relation identity determining subunit 821 shown in FIG. 11, when the correspondence relation is acquired from the first application, the relation identity determining subunit 821 can be realized by the following structure: a first determining module 1101, used for determining the second identity information corresponding to the first identity information in the first information list.

For instance, in the contact list application, there exists correspondence relation between the contact name "Mr. Luo" in the first information list and its registered name "LUO Yonghao". In the present embodiment, by using the correspondence relation, the second identity information "LUO Yonghao" corresponding to the first identity information "Mr. Luo" is determined in the first information list. Furthermore, the communication code of the second identity information "LUO Yonghao" is acquired. Thereby, the first device uses the communication code to initiate a voice or data communication connection to a second device corresponding to the communication code.

In addition, when the correspondence relation is acquired from the second application, the relation identity determining subunit 821 can be realized by the following structure: a second determining module 1102, used for determining the second identity information corresponding to the first identity information in the second information list.

For instance, in the Wechat application different from the contact list application, there exists correspondence relation between the first identity information and a Wechat friend name or its label name in the second information list. In the present embodiment, by using the correspondence relation, the second identity information "LUO Yonghao" corresponding to the first identity information "Mr. Luo" is determined in the second information list. Furthermore, the communication code of the second identity information "LUO Yonghao" is acquired. Thereby, the first device uses the communication code to initiate a voice or data communication connection to a second device corresponding to the communication code.

In addition, when the correspondence relation is acquired from the third application, the relation identity determining subunit 821 can be realized by the following structure: a third determining module 1103, used for obtaining a third information list in the third application, and determining the second identity information corresponding to the first identity information in the third information list.

For instance, in the Taobao application different from the contact list application and the Wechat application, there exists correspondence relation between the Taobao nicknames and consignee addresses. In the present embodiment, according to the correspondence relation, the third information list in the third application, namely the Taobao application, is acquired. The second identity information "LUO Yonghao" (consignee) corresponding to the first identity information "Mr. Luo" (Taobao nickname) is found in the third information list. Furthermore, the communication code of the second identity information "LUO Yonghao" is acquired. Thereby, the first device uses the communication code to initiate a voice or data communication connection to a second device corresponding to the communication code.

Figure 12:
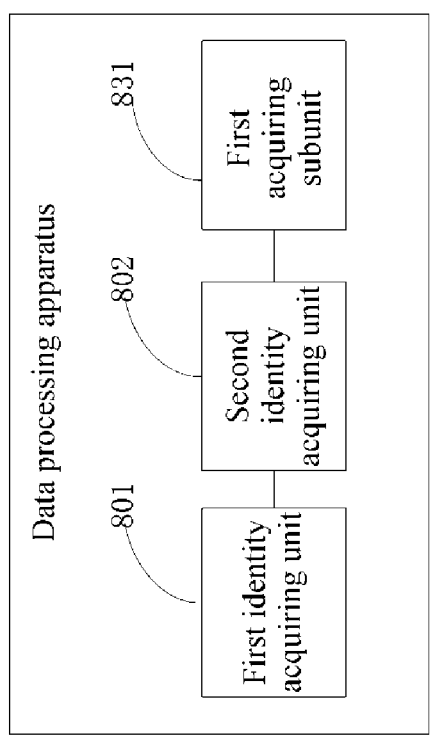
FIG. 12 is a structural schematic diagram of a data processing apparatus according to an embodiment.

Referring to FIG. 12, which is a structural schematic diagram of a data processing apparatus according to embodiment 10, the second code acquiring unit 803 can be realized by the following structure: a first acquiring subunit 831, used for acquiring a second communication code corresponding to the second identity information in the second information list.

For instance, in the Wechat application different from the contact list application, there exists correspondence relation between the first identity information and the Wechat friend name or its label name in the second information list. In the present embodiment, by using the correspondence relation, the second identity information "LUO Yonghao" corresponding to the first identity information "Mr. Luo" is determined in the second information list. Furthermore, in the Wechat friend list of the Wechat application, the communication code of "LUO Yonghao" is extracted from the friend information or its Wechat number of the friend named "LUO Yonghao". Thereby, the first device uses the communication code to initiate a voice or data communication connection to a second device corresponding to the communication code.

Figure 13:
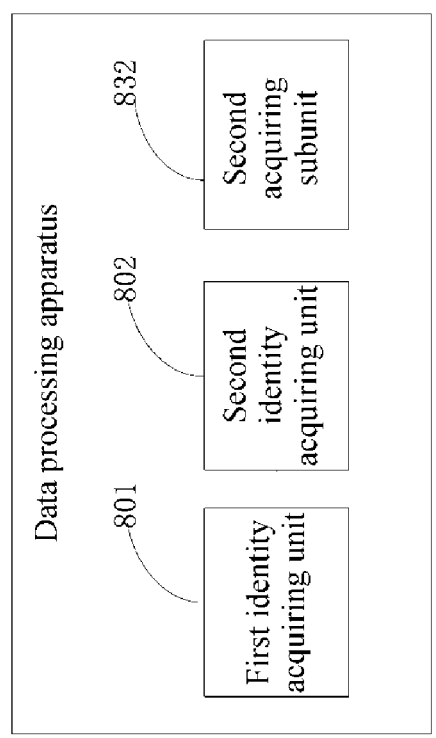
FIG. 13 is a structural schematic diagram of a data processing apparatus according to an embodiment.

Referring to FIG. 13, which is a structural schematic diagram of a data processing apparatus according to embodiment 11, the second code acquiring unit 803 can be realized by the following structure: a second acquiring subunit 832, used for acquiring a second communication code corresponding to the second identity information in the first information list.

For instance, after the second identity information "LUO Yonghao" corresponding to the first identity information "Mr. Luo" is found in the second application, i.e., the Wechat application different from the first application, i.e., the contact list application, the communication code of "LUO Yonghao" is found in the first information list of the first application, namely the contact information list of the contact list. Furthermore, the first device uses the communication code to initiate a voice or data communication connection to a second device corresponding to the communication code.

In addition, the second code acquiring unit 803 can be realized in the following manner: acquiring a second communication code corresponding to the second identity information in a third application list of the third application.

For instance, after the second identity information "LUO Yonghao" corresponding to the first identity information "Mr. Luo" is found in the second application, i.e., the Wechat application different from the first application i.e., the contact list application, when both the contact information list of the contact list and the Wechat friend list of the Wechat application do not contain the communication code of the second identity information "LUO Yonghao", in the third application, i.e., the Taobao application different from the first application and the second application, the communication code of the consignee name "LUO Yonghao" can be found. Furthermore, the first device uses the communication code to initiate a voice or data communication connection to a second device corresponding to the communication code.

Figure 14:
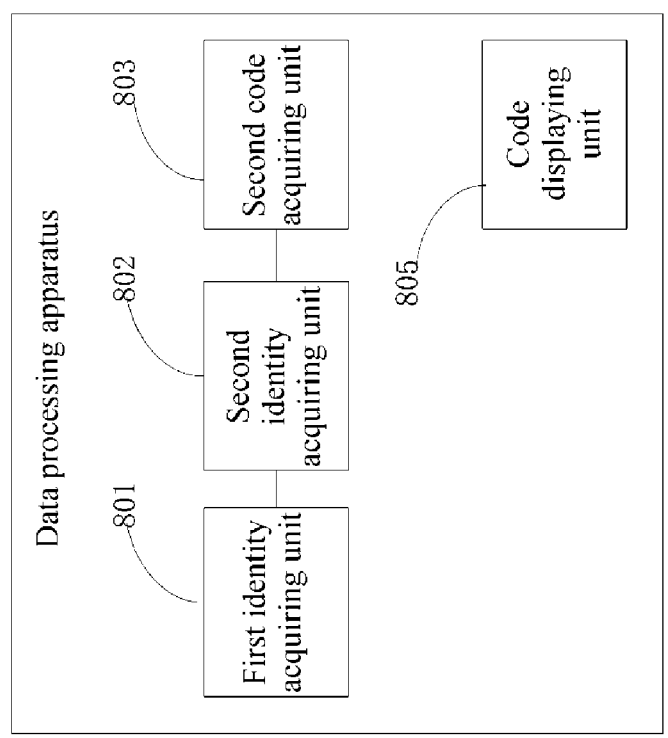
FIG. 14 is a structural schematic diagram of a data processing apparatus according to an embodiment.

Referring to FIG. 14, which is a structural schematic diagram of a data processing apparatus according to embodiment 12, the apparatus can further comprise the following structure: a code displaying unit 805 used for displaying the second communication code on the first device to prompt the user to use the first device to initiate a voice or data communication connection to the second device corresponding to the second communication code by using the second communication code, after the second code acquiring unit acquires, based on the second identity information, the second communication code corresponding to the second identity information.

As shown in FIG. 7, the second communication code is displayed on the first device. The user can initiate a voice or data communication connection to the second device corresponding to the second communication code by operating a corresponding control.

If the functions of the method in the present embodiment are implemented in a manner of software function unit and are sold or used as an independent product, the functions can be stored in a computer readable storage medium. Based on such understanding, the part of the embodiments of the present application contributing to the prior art or the part of the technical solutions can be embodied in manner of a software product; and the software product is stored in a storage medium and comprises a plurality of instructions to enable one computing device (i.e., a personal computer, a server, a mobile computing device or a network device) to execute all or a part of the steps of the method of respective embodiments of the present application. The above mentioned storage medium comprises various mediums capable of storing a program code, such as a USB disk, a removable hard disk, a Read-Only Memory (ROM), a Random Access Memory (RAM), a diskette, a compact disk, and the like.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

Additionally, embodiments may take the form of a product embodied in one or more computer readable storage mediums storing machine readable code, computer readable code, and/or program code, referred hereafter as code. The storage devices may be tangible, non-transitory, and/or non-transmission. The storage devices do not embody mere signals, though in certain embodiments, the storage devices employ signals for accessing code.

What is claimed is:

1. An electronic device, comprising:
a processor;
a memory module coupled to the processor, wherein the memory module stores a plurality of applications including a first application and a second application different from the first application;
a display module coupled to the processor, wherein the display module displays the plurality of applications;
an input module coupled to the processor, wherein the input module inputs information into the processor;
wherein the processor is operative to determine whether a first contact information in relation to a first identity information input via the input module is available from the first application; and
wherein the processor is operative to determine, responsive to determining that the first contact information is not available from the first application, a second contact information comprising a second identity information corresponding to the first identity information from the second application;
wherein the processor is operative to populate a communication information field associated with the first identity information with the second identity information.

2. The electronic device of claim 1, wherein the display module is operative to display the second contact information if available.

3. The electronic device of claim 1, wherein the processor is operative to establish a communication connection based on the second contact information if available.

4. A data processing method, comprising:
acquiring, at a first device, a first identity information inputted by a user;
inquiring, based on the first identity information, a second identity information corresponding to the first identity information in a second information list different from a first information list, the second information list being located in a different application on the first device than the first information list;
inquiring the second identity information corresponding to the first identity information in the first information list;
inquiring the second identity information corresponding to the first identity information in the second information list when no second identity information corresponding to the first identity information is found in the first information list; and acquiring, based on the second identity information, a second communication code corresponding to the second identity information, wherein the second communication code is used for the first device to initiate a voice communication connection or a data communication connection to a second device corresponding to the second communication code.

5. The method of claim 4, wherein the inquiring further comprises:
   determining, based on a correspondence relation, the second identity information corresponding to the first identity information, wherein the corresponding relation can be acquired from a first application, a second application or a third application different from the first application and the second application.

6. The method of claim 5, wherein the correspondence relation from the first application is acquired by determining the second identity information corresponding to the first identity information in the first information list.

7. The method of claim 5, wherein the correspondence relation from the second application is acquired by determining the second identity information corresponding to the first identity information in the second information list.

8. The method of claim 5, wherein the correspondence relation from the third application is acquired by determining the second identity information corresponding to the first identity information comprises:
   acquiring a third information list in the third application; and
   determining the second identity information corresponding to the first identity information in the third information list.

9. The method of claim 4, wherein the acquiring further comprises:
   acquiring a second communication code corresponding to the second identity information in the second information list.

10. The method of claim 4, wherein the acquiring further comprises:
    acquiring a second communication code corresponding to the second identity information in the first information list.

11. The method of claim 4, further comprising:
    displaying the second communication code on the first device to prompt the user to use the first device to initiate a voice communication connection or a data communication connection to the second device corresponding to the second communication code by using the second communication code.

12. A data processing apparatus, comprising:
    a first identity acquiring unit, wherein the first identity acquiring unit acquires a first identity information inputted by a user at a first device;
    a second identity acquiring unit, wherein the second identity acquiring unit inquires, based on the first identity information, a second identity information corresponding to the first identity information in a second information list different from a first information list, the second information list being located in a different application on the first device than the first information list;
    a first list inquiring unit, wherein the first list inquiring unit inquires the second identity information corresponding to the first identity information in the first information list, and triggers the second identity acquiring unit to inquire the second identity information corresponding to the first identity information in the second information list when no second identity information corresponding to the first identity information is found in the first information list; and
    a second code acquiring unit, wherein the second code acquiring unit acquires, based on the second identity information, a second communication code corresponding to the second identity information, wherein the second communication code is used for the first device to initiate a voice communication connection or a data communication connection to a second device corresponding to the second communication code.

13. The apparatus of claim 12, wherein the second identity acquiring unit further comprises:
    a relation identity determining subunit, wherein the relation identity determining subunit determines, based on a correspondence relation, a second identity information corresponding to the first identity information; wherein the correspondence relation can be acquired from a first application, a second application or a third application different from the first application and the second application.

14. The apparatus of claim 13, wherein the relation identity determining subunit comprises:
    a first determining module, wherein the first determining module determines the second identity information corresponding to the first identity information in the first information list when the correspondence relation is acquired from the first application;
    a second determining module, wherein the second determining module determines the second identity information corresponding to the first identity information in the second information list when the correspondence relation is acquired from the second application;
    a third determining module, wherein the third determining module obtains a third information list in the third application and determining the second identity information corresponding to the first identity information in the third information list when the correspondence relation is acquired from the third application.

15. The apparatus of claim 12, wherein the second code acquiring unit comprises:
    a first acquiring subunit, wherein the first acquiring subunit acquires a second communication code corresponding to the second identity information in the second information list.

16. The apparatus of claim 12, wherein the second code acquiring unit comprises:
    a second acquiring subunit, wherein the second acquiring subunit acquires a second communication code corresponding to the second identity information in the first information list.

17. The apparatus of claim 12, further comprising:
    a code displaying unit, wherein the code displaying unit displays the second communication code on the first device to prompt the user to use the first device to initiate a voice communication connection or a data communication connection to the second device corresponding to the second communication code by using the second communication code, after the second code acquiring unit acquires, based on the second identity information, the second communication code corresponding to the second identity information.

18. The apparatus of claim 12, wherein:
    the first information list contains multiple pieces of first identity information;
    the second information list contains multiple pieces of second identity information;

the first information list corresponds to a first application;
the second information list corresponds to a second application; and
the first application is different from the second application.

* * * * *